April 18, 1933. C. C. HERITAGE 1,904,047
PROCESS OF REDUCING A NITRO COMPOUND BY MEANS OF A METAL
Filed April 12, 1926
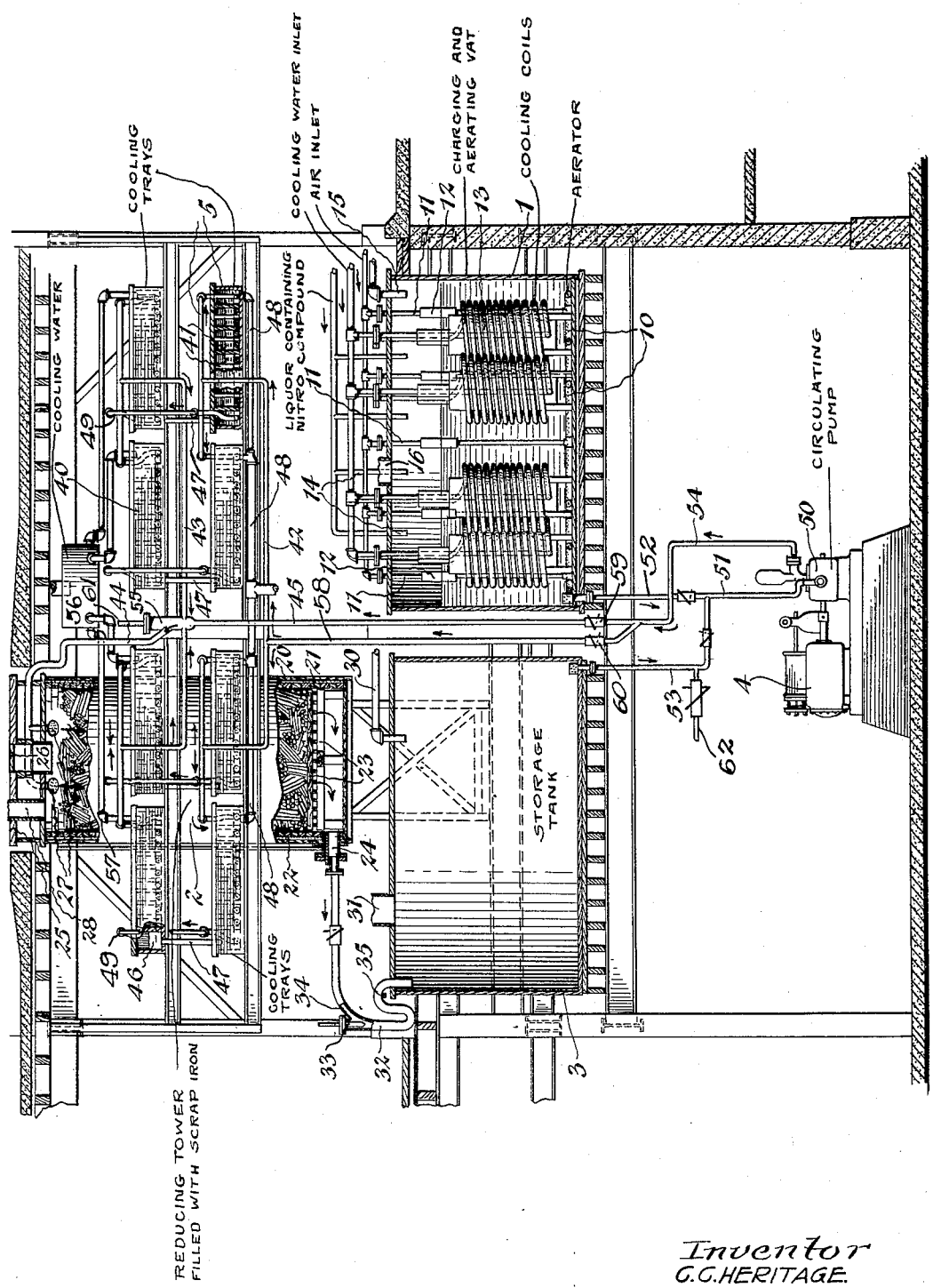
Inventor
C. C. HERITAGE
by William J. Warslake
Attorney Patented Apr. 18, 1933

1,904,047

UNITED STATES PATENT OFFICE

CLARK C. HERITAGE, OF BUFFALO, NEW YORK, ASSIGNOR TO NATIONAL ANILINE & CHEMICAL CO., INC., OF NEW YORK, N. Y., A CORPORATION OF NEW YORK

PROCESS OF REDUCING A NITRO COMPOUND BY MEANS OF A METAL

Application filed April 12, 1926. Serial No. 101,399.

This invention relates to methods of reduction and particularly to the reduction of nitro compounds under acid conditions.

Acid reductions, particularly of organic nitro-compounds for the production of amino compounds, have not found favor commercially owing to the fact that the processes and apparatus which the art teaches are adapted for such reductions, and which involve the gradual addition of cast iron borings to an agitated vat charged with liquor, have been found to be unfeasible in practice.

The failure of such prior processes and apparatus may be attributed to a number of factors, chief of which are: the excessively high cost of maintaining the agitation equipment when used in acid media; the lack of control of the reaction, which is apt to become violent; and the sludge deposited by cast iron borings, which affects the subsequent treatment of the amino compounds produced.

The present invention has for an object the carrying out of acid reductions with avoidance of agitated equipment. A further object is a method and apparatus that affords adequate regulation of the conditions of the reaction. The invention further contemplates the use of a metallic substitute for cast iron borings that avoids the difficulties attending the use of the latter. These and other objects will appear from the following description.

Briefly summarized, the process forming a part of the present invention accomplishes these objects by distributing over a body of a suitable metal an acid liquor containing the compound to be reduced, particularly by passing the liquor in contact with an extended body of the metal. Control of reaction conditions is obtained by reducing only a portion of the charge at any instant and applying temperature regulating means to compensate for the temperature change produced in the charge during the reduction; and this is further promoted by a cyclical treatment of the charge, which not only provides a facile regulation but also affords a substantial completion of the reduction. Wrought iron scrap is preferably employed as the metal, instead of iron borings, in view of its superiority; in that it gives a product that is substantially free from sludge.

A suitable apparatus for carrying out the process, and also forming a part of the invention, comprises a charging or aerating vat, for initially containing the liquor to be treated; a reactor or reducing tower; a reservoir or receiving vat, for providing storage for the liquor flowing from the tower; a circulating means, such as a pump or air lift having connection with the vat, reservoir and tower, for causing the flow of liquor from the vat or reservoir to the tower; and a heat transfer means or cooler, for regulating the temperature of the liquid.

For a better understanding of the invention reference should be had to the following description and accompanying drawing forming a part of this specification, wherein are described and illustrated a preferred method and apparatus for embodying the principles of said invention; but it is to be understood that the invention is not limited thereto except as indicated in the claims.

The single figure of the accompanying drawing shows the apparatus in elevation.

In the drawing, reference numeral 1 indicates a charging vat into which nitrated liquor is first introduced, 2 denotes a reactor or reducing tower, 3 is a reservoir or storage tank into which the tower empties, 4 is a circulating pump, and 5 is a cooler.

The charging vat 1 comprises a tank provided with an aerating means 10, such as one or more flat coils of perforated lead pipe on the bottom of the vat, and with lead pipe cooling coils 13 for regulating the temperature. Air is supplied to the aerating means 10 by pipes 11 which are protected from corrosion by wooden sleeves 12, at the normal liquid level, filled with a suitable cement, for instance sulfur and sand. Liquor is admitted to the vat through the inlets 14, diluting water is supplied by a pipe 15, and gases are removed through a vent 16, which extends upwardly from the vat cover.

The reactor or tower 2 is preferably constructed of wooden staves 20 lined with acid proof bricks 21; a layer 22 of reinforced cement may be interposed between the staves and the brick lining to which layer the bricks may be suitably bonded. Within the tower is a wooden slatted false bottom 23 for supporting the iron scrap with which the tower is filled. A lead covered iron nipple 24 extends through the wall at the bottom, forming an outlet. A cover 25, having a charging opening 26 for inserting fresh bundles of iron scrap, carries a plurality of distributors or spray nozzles 27 for introducing the liquor into the tower, and is provided with a vent 28 to carry off hydrogen and vapors evolved during the reduction.

The reservoir or receiving vat 3 comprises a tank having a vent 31 for carrying off vapors, a pipe 32 connected to the nipple 24 for conducting liquid from the tower 2 to the vat, and an outlet pipe 53. Pipe 32, which is made of lead, has a thermometer well 33 inserted in a bend 34, and a nipple 35 projecting from it to permit samples of the liquor to be taken. A water line 30 affords means for diluting the vat contents.

The heat transfer means or cooler 5 consists of a plurality of wooden trays 40, each with staggered baffles 41 and a flat coil of lead pipe within the winding channel thus formed. The trays are arranged in two tiers, and a coil in a lower tray is connected through pipe line 49 to that of a tray directly above. A pipe line 42, branching from line 58, serves to distribute liquor to each of the lower coils; and pipe lines 43, leading to a header or manifold 55, form common returns for the upper trays. A line 44 runs from the header 55 to the reduction tower, terminating in the spray nozzles 27. Cold water for cooling the coils is supplied to the upper trays from a common supply 56 by pipes 57, and is caused to flow through the winding channel in an upper tray, over a weir 46 in the end of the channel through a pipe 47 to the tray below and thence out through a pipe 48.

The circulating means 4 for causing the flow of liquor from the aerating vat 1 or the reservoir 3 through the trays and to the top of the reduction tower comprises a single pump 50, as shown, having a branched intake 51. One branch 52 connects with the outlet of the aerating vat 1, and the other 53 connects with the outlet of the reservoir 3. Each branch has its individual valve control, and in addition branch 53 has a valve-controlled outlet 62 for removing material from the system.

A branched exhaust pipe 54 leads from the exhaust of the pump 50 to the pipes 45 and 58, the pipe 45 directly connecting the exhaust pipe 54 with the header 55, and the pipe 58 connecting the exhaust 54 with line 42 above described. By means of this arrangement and the valves 59 and 60 on the pipes 45 and 58, respectively, the liquor may be pumped either directly to the tower through pipes 44 and 45, or first through the cooling trays 5 and then to the tower, or partially through both. A thermometer 61 in the header 55 serves to indicate the temperature of the liquor before it enters the tower.

In the preferred mode of carrying out the process, a batch or charge of liquor as it comes from the nitrating kettle and containing in acid solution the nitro compound to be reduced, for example, 1-nitronaphthalene-3.6.8-trisulfonic acid, together with residual nitrogen oxides, is led into the charging vat 1. Here it is diluted to the desired strength, and is cooled by the cooling coils 13; the temperature being preferably maintained below 45° C. Air is passed through the liquor by means of the aerator 10 to remove nitrous oxide remaining in solution from the nitration. When cooled and aerated, the valve on pipe 52 is opened, and the liquor is pumped from vat 1 to the top of the tower 2 through pipes 54 and 45, valve 60 being closed and valve 59 being open. There it is disributed or sprayed over the iron scrap with which the tower is filled. Since the liquor is strongly acid with sulfuric acid, the iron is attacked, and the nitro compound present in the liquor becomes reduced as it travels down through the tower in contact with the iron. It then flows out at the bottom of the tower 2, and is directed to the reservoir 3. From the reservoir it is drawn through pipe 53 to the pump 50 and then pumped through pipes 54 and 58 to the cooling trays 5, valve 60 being open and valve 59 being closed. Here the heat liberated by the reducing reaction in the tower 2 is removed, so that the temperature of the liquor is preferably between 40° and 45° C.; that is, the temperature of the liquor is regulated to compensate for the change in temperature produced during the reaction. From the cooling trays the liquor is returned to the top of the tower. The batch or charge of liquor is recirculated in this manner until a test sample shows a satisfactory reduction; for example, a substantially complete reduction of the 1-nitronaphthalene-3.6.8-trisulfonic acid to 1-naphthylamine-3.6.8-trisulfonic acid (amino-H acid). It is then removed for further treatment or use.

The iron with which the tower is filled is preferably wrought iron scrap packed in bundles of convenient size. As the iron is used up and settles in the tower, fresh bundles are charged into the tower through opening 26, so that it is maintained substantially full of iron at all times. With the use of wrought iron, a substantially clear solution results free from the sludge which is obtained when cast iron is used and which adversely affects subsequent operations on the liquor. Free hydrogen that is evolved in the tower is carried off by the vent 28.

If desired, the charging or denitrating vat 1 and the reservoir or receiving vat 3 instead of being separated, as shown, may be combined into one, in which case the liquor is circulated from the one vat to the tower and back again. With this arrangement, it is preferable to have cooling trays intermediate the vat and the tower to adequately control the temperature; though the trays may be dispensed with entirely and reliance placed upon cooling coils in the vat or other means associated with the apparatus. The separate vats, however, afford a better control of conditions, such as the temperature, and enable a second batch of nitration liquor to be cooled and denitrated in the denitrator while the reduction is going on in the remainder of the apparatus, thus considerably shortening the time cycle for a batch of material.

Although a specific example has been given of the application of the invention to the reduction of 1-nitronaphthalene-3.6.8-trisulfonic acid to amino-H acid, it will be evident that the process and apparatus of the invention are applicable to the production of other amino compounds. Moreover, while the invention is primarily concerned with acid reductions, it has a more general application. The claims are accordingly to be interpreted in the light of the broad disclosure and given a scope commensurate therewith.

I claim:

1. In the process of reducing a nitro compound by means of a metal, the improvement which comprises distributing a solution of the nitro compound upon, and passing it through, a relatively stationary body of the metal.

2. In the process of reducing a nitro compound by means of a metal, the improvements which comprise passing a solution of the nitro compound through a body of the metal, cooling the resulting liquor and returning said cooled liquor for recirculation and contact with the metal until the reduction is substantially completed.

3. In the process of reducing a nitro compound by means of a metal, the improvements which comprise passing a solution of the nitro compound through a body of the metal, withdrawing the resulting liquor from the body of metal before reduction is substantially completed, regulating the temperature of the resulting liquor to compensate for the temperature change produced during the reaction, and returning the liquor for recirculation in contact with the metal until the reduction is substantially completed.

4. In the process of reducing a nitro compound by means of a metal and an acid, the improvements which comprise passing an acid solution of a nitro compound in contact with the metal so that a portion only of the solution constituting a charge is in contact therewith at any instant, withdrawing the resulting liquor from the metal before reduction is substantially completed, regulating the temperature of the liquor resulting from said contact to compensate for the temperature change produced during the reaction, and returning the liquor for recirculation in contact with the metal until the reduction is substantially completed.

5. In a process of reducing an organic nitro compound by means of a metal, the improvement which comprises passing in contact with the metal a solution of an organic nitro compound resulting from the nitration of an organic compound and from which oxides of nitrogen have been removed, and withdrawing the resulting liquor from the metal before reduction is substantially completed.

6. In the process of reducing an organic nitro compound by means of a metal and an acid, the improvement which comprises forming a body of pieces of wrought iron, passing an acid solution of the nitro compound in contact with said body of wrought iron, removing said liquid from said body of wrought iron before reduction is substantially completed, removing from said liquid heat generated during said contact, and again passing said liquid in contact with said body of wrought iron.

7. In the process of reducing 1-nitro-naphthalene-3.6.8-trisulfonic acid by means of a metal, the improvement which comprises passing an acid solution of the nitro trisulfonic acid downward through a zone containing a relatively stationary body of said metal.

8. In the process of reducing a nitro compound by means of a metal, the improvement which comprises passing a solution of the nitro compound through a body of the metal, withdrawing the resulting solution from the body of metal before reduction is substantially completed, cooling the resulting solution, and returning said solution for recirculation in contact with the metal.

9. In the process of reducing a nitro compound by means of a metal and an acid, the improvement which comprises passing an acid solution of the nitro compound through a packed tower containing said metal as packing.

10. In the process of reducing a nitro compound by means of a metal and an acid, the improvement which comprises passing an acid solution of the nitro compound in contact with the metal, withdrawing the resulting liquor from the metal before reduction is substantially completed, cooling the resulting liquor, and returning the liquor for recirculation in contact with the metal.

11. In the process of reducing 1-nitronaphthalene-3.6.8-trisulfonic acid by means of a metal and sulfuric acid, the improvement which comprises passing the trisulfonic acid in solution in sulfuric acid in contact with the metal, withdrawing the resulting liquor from the metal before reduction is substantially completed, cooling the resulting liquor, and returning the liquor for recirculation in contact with the metal until the reduction is substantially completed.

12. The process of producing amino-H acid which comprises passing a nitration reaction mixture which contains a sulfuric acid solution of 1-nitronaphthalene-3.6.8-trisulfonic acid and from which solution oxides of nitrogen have been removed.

13. The process of producing amino-H acid which comprises aerating a batch of a nitration reaction mixture which contains 1-nitronaphthalene-3.6.8-trisulfonic acid in solution in sulfuric acid and oxides of nitrogen, passing the aerated batch in contact with an extended body of wrought iron, withdrawing the resulting liquor from the body of wrought iron before reduction is substantially completed, removing from the resulting liquor heat generated during said contact, and returning the liquor for recirculation in contact with the wrought iron until the reduction is substantially completed.

14. In the process of reducing an organic nitro compound by means of a metal and an acid, the improvement which comprises forming a body of liquid comprising an acid solution of the organic nitro compound, forming a relatively stationary body of the metal, withdrawing a portion of said liquid from said body thereof, passing said portion in contact with said metal, and withdrawing the resulting liquid from said body of metal before reduction is substantially completed.

15. In the process of reducing an organic nitro compound by means of a metal and an acid, the improvement which comprises forming a body of liquid comprising an acid solution of the organic nitro compound, providing a packed tower containing said metal as packing, continuously withdrawing portions of said liquid from said body thereof, continuously passing said portions downward through said packed tower in contact with said metal, and continuously withdrawing the resulting liquid from said tower before reduction is substantially completed.

16. In the process of reducing an organic nitro compound by means of a metal, the improvement which comprises forming a relatively stationary body of pieces of the metal, passing portions of a solution of the nitro compound through said body of metal, withdrawing the resulting liquid from said body of metal before reduction is substantially completed, and again passing said liquid in contact with said body of metal.

17. In the process of reducing an organic nitro compound by means of a metal and an acid, the improvement which comprises forming a body of liquid comprising an acid solution of the organic nitro compound, providing a packed tower containing said metal as packing, withdrawing portions of said liquid from said body thereof, passing said portions through said packed tower in contact with said metal, withdrawing the resulting liquid from said tower before reduction is substantially completed, and returning said liquid to said body of liquid for recirculation.

18. In the process of reducing 1-nitronaphthalene-3.6.8-trisulfonic acid by means of a metal and sulfuric acid, the improvement which comprises forming a body of liquid comprising a sulfuric acid solution of 1-nitronaphthalene-3.6.8-trisulfonic acid, forming a body of the metal, continuously withdrawing portions of said liquid from said body thereof, cooling said portions, continuously passing said portions in contact with said body of metal, continuously withdrawing the resulting liquid from said body of metal before reduction is substantially completed, and returning said liquid to said body of liquid for recirculation.

In testimony whereof I affix my signature.

CLARK C. HERITAGE.